United States Patent

Garriss

[11] Patent Number: 5,163,107
[45] Date of Patent: Nov. 10, 1992

[54] FIBER OPTIC COUPLER/CONNECTOR WITH GRIN LENS

[75] Inventor: Gregory M. Garriss, Federal Way, Wash.

[73] Assignee: The Boeing Company, Seattle, Wash.

[21] Appl. No.: 779,786

[22] Filed: Oct. 21, 1991

[51] Int. Cl.⁵ .............................................. G02B 6/32
[52] U.S. Cl. ....................................... 385/74; 385/34; 385/51; 385/124; 385/139; 385/59
[58] Field of Search .................... 385/33, 34, 74, 77, 385/80, 138, 139, 124, 93, 51, 59

[56] References Cited

U.S. PATENT DOCUMENTS

| | | | |
|---|---|---|---|
| 3,829,195 | 8/1974 | Rawson | 385/34 X |
| 4,060,309 | 11/1977 | Le Noane et al. | 385/93 |
| 4,268,112 | 5/1981 | Peterson | 385/33 X |
| 4,360,249 | 11/1982 | Slemon | 385/138 |
| 4,398,791 | 8/1983 | Dorsey | 385/33 |
| 4,718,746 | 1/1988 | Chrepta | 385/74 X |
| 4,732,452 | 3/1988 | Carter | 385/33 |
| 4,786,135 | 11/1988 | Boero | 385/93 |
| 4,889,406 | 12/1989 | Sezerman | 385/74 X |
| 4,925,267 | 5/1990 | Plummer et al. | 385/74 |
| 4,932,742 | 6/1990 | Tohme | 385/33 |

Primary Examiner—Brian Healy
Attorney, Agent, or Firm—Conrad O. Gardner; B. A. Donahue

[57] ABSTRACT

A robust optic fiber coupler which connects to an optic fiber cable via a quick disconnect optic fiber connector. The robust coupler contains a GRIN lens positioned in a bore through the coupler axially aligned with the optic fiber. The GRIN lens acts to expand and collimate input/output optic signals which are then passed through a protective window in the axial bore and emitted from the end plate face of the robust coupler. The optic signals are coupled between two optic fiber cables, each fitted with a subject robust coupler, when the coupler end plate faces are positioned adjacent to each other with each axial bore and associated GRIN lens and optic fiber commonly and axially aligned through a process such as a robotic arm and end effector connection.

7 Claims, 2 Drawing Sheets

FIBER OPTIC COUPLER/CONNECTOR WITH GRIN LENS

BACKGROUND OF THE INVENTION

The present invention generally relates to an optic fiber coupler and more particularly relates to robust, removable, optic fiber coupler which allows for a simple, passive optic fiber alignment without concern for large mechanical discrepancies of slight contamination between the couplers as found in severe environments within the manufacturing industries.

Coupling or connecting optic fibers is well known in prior art. However, the prior art, as discussed below, consists of permanent of semi-permanent couplers or connector which use various precise means to connect fiber optic cables, thereby precisely aligning the cables.

U.S. Pat. No. 3,829,195 (Rawson) utilizes two permanently attached, movable, graded index-of-refraction cylindrical segments of unequal length precisely adjusted by a micromanipulator to splice together optic fibers to achieve precise highly efficient coupling of two optic fibers.

U.S. Pat. No. 4,268,112 (Peterson) teaches permanently connecting optic fibers by precisely placing the two fiber ends into the same connector. In addition, the connector utilizes two solid hemispherical lenses to expand the light and an optically transmissive material to assist in transmitting the optic signals between fibers.

U.S. Pat. No. 4,718,746 (Chrepta) utilizes a single, bored, graded index rod to connect to two precisely placed optic fibers. In addition, the bore is filled with a gel to protect against contamination.

U.S. Pat. No. 4,889,406 (Sezerman) teaches the use of spherical lenses at the end of two optic fibers, and the optic fibers are inserted into each end of a precisely machined mechanical fitting which is angularly adjusted by manipulating fine adjustment screws on the mechanical fitting.

The use of optic fibers for transmission of data or optical information is becoming more and more prevalent throughout industries. An optic fiber, made of silica glass or other appropriate material surrounded by a suitable material, is essentially a "light tube" or waveguide in which light energy travels in a controlled manner. To make the optic fiber durable and somewhat manageable, the fiber is shielded in a protective and insulating material, thus creating an optic fiber cable. The goal in end-to-end coupling of two optic fiber cables is to maximize the transfer of light energy from a transmitting cable to a receiving cable, thereby allowing for accurate transmission of data.

Optic fiber coupling technology is desired in many situations in which precision placement or close tolerance alignment of these extremely fine fibers is not mechanically or economically feasible. For example, optic fiber data transmission in the area of robotics is desired by manufacturers, but the tolerance in the fit between a robotic arm and a "quick-change" and effector is insufficient to allow optic fiber coupling via techniques described in the above prior art.

To allow for large mechanical displacements between optic fiber ends as would occur in robotic applications, the invention described herein utilizes a removable coupler device containing a gradient refractive index (GRIN) lens, and the device attaches to the end of an optic fiber. Two optic fibers are coupled simply by placing, holding, or positioning the end faces of the couplers parallel to each other such that the GRIN lenses are coaxially aligned. The invention does not require both couplers to be positioned within a precision mechanical sleeve to obtain proper alignment. The invention does allow for larger mechanical displacements, well within the tolerances of the interface between a robotic arm and a quick change end effector.

SUMMARY OF THE INVENTION

It is therefore the object of the present invention to provide a robust means to couple optic fibers.

More specifically, an object of this invention is an optic fiber coupler, attached to the end of an optic fiber cable, which allows optic fibers to be coupled in a fast, robust, inexpensive, and efficient manner by simply aligning the face of one coupler with the corresponding face of a second coupler, thereby eliminating the labor intensive need for a precision match to accurately align two fiber cables within a connector.

Yet another object of this invention is a robust optic fiber coupler which allows for an efficient coupling between optic fibers when contaminants may exist between two couplers, thereby greatly reducing sensitivity to contaminants.

A further object of this invention is an efficient and inexpensive optic fiber coupler which allows for coupling of optic fibers such that the optic fibers remain physically unconnected, e.g. no common connector between two optic fibers, thereby allowing for extremely quick coupling and uncoupling of the optic fibers.

Briefly, these and other objects of the present invention are realized in a specific illustrative embodiment thereof. An optic fiber coupler, attached to an optic fiber cable, consists of a mechanical fitting to which the optical fiber is connected, such that the optic fiber is axially aligned with a GRIN lens. The GRIN lens is located in an axial bore through the coupler, and is positioned between the optic fiber and a flat face of the coupler. The optic signal from the optic fiber cable is expanded by the GRIN lens, passed through the axial bore, and emitted from the coupler's flat face.

Optic fibers are coupled when the bores and the flat faces of two couplers are axially aligned. Thus, when so positioned, e.g. by way of a robotic arm engaging an end connector, the expanded optic signal emitted from one coupler is received by the second coupler, wherein the optic signal is properly reduced by the second GRIN lens to correspond to the receiving optic fiber. The above and other objects of the present invention will be more clearly understood from the following detailed description taken in conjunction with the accompanying drawings in which:

DETAILED DESCRIPTION OF THE PREFERRED EMBODIMENT

Figure 1:
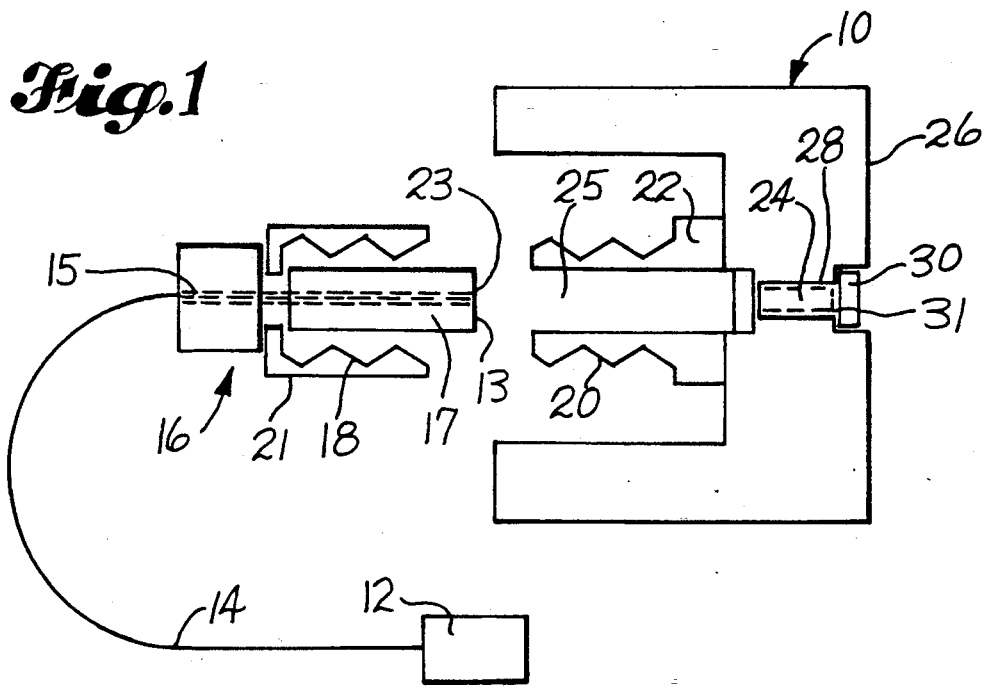
FIG. 1 is a schematic (side view) of a robust optic fiber coupler prior to connection with an optic fiber cable.

One embodiment of a robust optic fiber coupler 10 according to the present invention is illustrated in FIG. 1. The robust coupler 10 allows optic signals to efficiently pass between couplers on the end of an optic fiber cable 14 (see FIG. 2). The optic signals are generated from a fiber optic device 12 and transmitted through optic fiber cable 14. The optic fiber cable 14 is connected to the robust coupler 10 by an optic fiber connector 16. Optic fiber cable 14 is permanently located within an axial bore 15 along the axial of optic fiber connector 16, such that the optic fiber end 23 is in the same plane as the end 13 of the optic fiber threads 18 is located on optic fiber connector 16 such that threaded collar 21 can freely rotate about the connector cylinder's 17 longitudinal axis.

The optic fiber coupler 10 is attached to the optic fiber connector 16 by positioning connector cylinder 17 inside the connector cylinder bore 25 which is located in the optic fiber coupler's 10 connection mechanism 22. Connector cylinder 17 is held in place within connector cylinder bore 25 by engaging the internal threads 18 with the external threads 20 located on the outer surface of connection mechanism 22. Upon connecting the robust coupler 10 with the optic fiber connector 16, the optic fiber end 23 is positioned at the correct focal length from a cylindrical gradient refractive index (GRIN) lens 24. In the preferred embodiment, the GRIN lens is a point twenty-three pitch lens.

The robust coupler 10 contains a GRIN lens 24, secured by adhesive, in an axial bore 28 through robust coupler 10. When robust coupler 10 is connected to the optic fiber cable 14 as described above, the optic fiber cable 14 is properly axially aligned with the GRIN lens 24. Thus, optic signals are transmitted from the fiber optic cable 14, out the optic fiber end 23, through the GRIN lens 24, and out the end optic face 26 of robust coupler 10 via the axial bore 28. GRIN lens 24 acts to collimate the optic signal output/input from optic fiber cable 14.

In addition, a protective window 30 covers the axial bore face 31 furthest from optic fiber end 23, thereby protecting the GRIN lens 24 from oil, metal chips, dust, and other contaminants common in industries. Protective window 30 is made of an optic filter material such as a selectively absorptive glass which provides for optical noise isolation from external sources.

Figure 2:
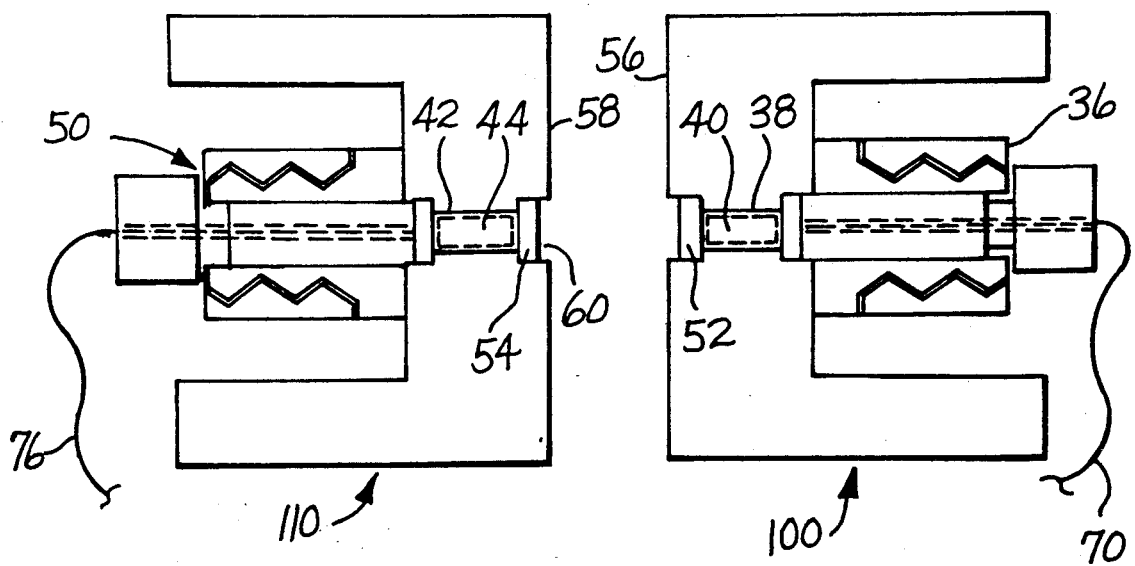
FIG. 2 is a schematic (side view) of two robust optic fiber couplers, each connected to respective optic fiber cables, properly positioned and aligned for coupling of optic signals between the two couplers.
Figure 3:
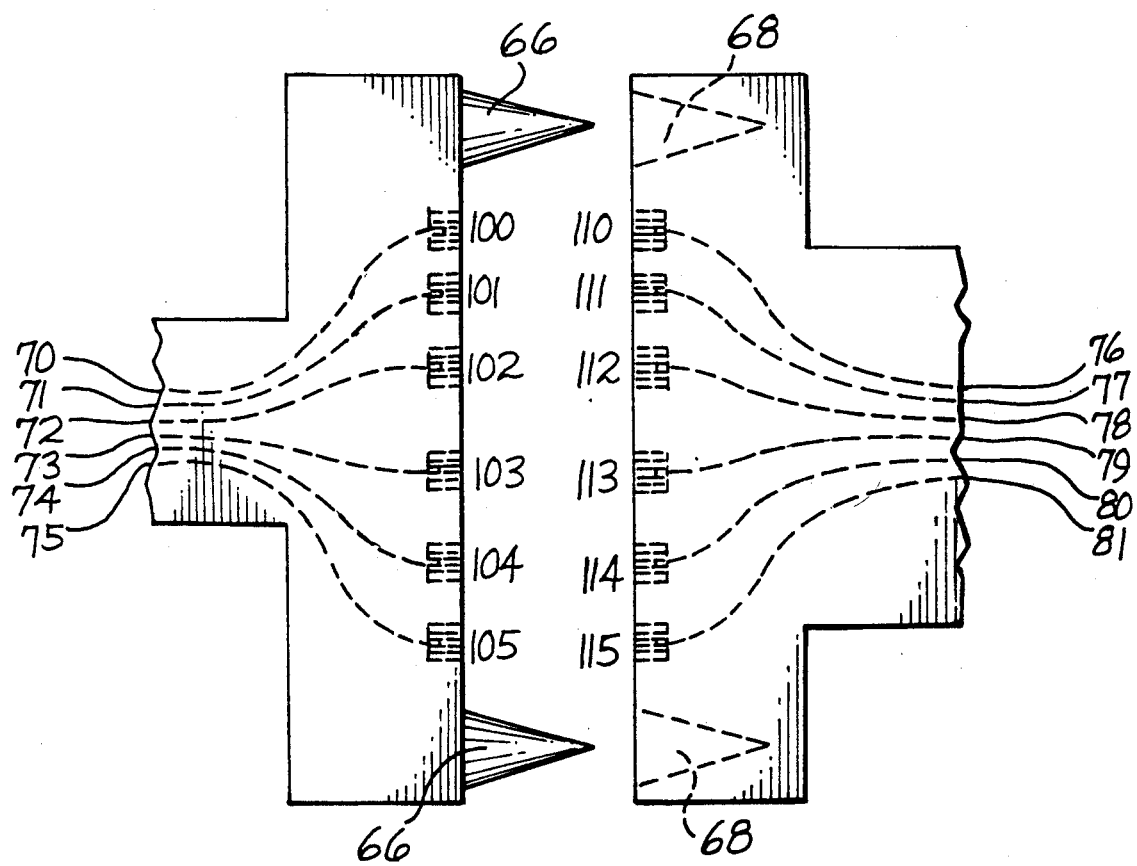
FIG. 3 is a function schematic of robust optic fiber couplers in a robotic arm and an end effector just prior to engagement.

FIG. 2 illustrates the relative positions of two independent robust couplers, 100 and 110, during the coupling of optic fiber cables between a robotic arm 62 (see FIG. 3) and a corresponding end effector 64 (see FIG. 3). Robotic arm coupler 100, connected to optic fiber cable 70 via fiber connector 36 is positioned such that the axial bore 38 and GRIN lens 40 are commonly aligned with the similar axial bore 42 and GRIN lens 44 in the end effector coupler 110. Thus, couplers 100 and 110 are positioned in an end to end manner. Similar to the robotic arm robust coupler 100, the end effector robust coupler 110 is connected to an optic fiber cable 76 via an optic fiber connector 50, thereby providing for transmission of the optic signal output/input.

FIG. 3 illustrates the positioning of optic fiber couplers, 100–105 mounted in a robotic arm 62 and optic fiber couplers 110–115 mounted in an end effector 64. Optic fiber cables 70–81 are connected to the optic fiber couplers 100–105 and 110–115 in the same manner described above for FIG. 1. When robotic arm 62 engages end effector 64, the alignment pins 66 on robotic arm 62 fit into alignment holes 68, thereby properly aligning optic fiber couplers 100–105 with optic fiber couplers 110–105 in a coaxial, end-to-end manner. This method of aligning the optic fiber couplers 100–105 and 110–115 allows for very fast and efficient coupling and uncoupling of optic fiber cables 70–75 and 76–81 respectively.

As seen in FIG. 2, the commonly aligned robotic arm coupler window 52 and end effector coupler window 54 are each slightly recessed from their respective end plate faces, 56 and 58, of robust couplers 100 and 110 respectively. These recesses form a small air gap 60 which will exist between the two protective windows, 52 and 54, in the event the end plate faces, 56 and 58, come into contact, thereby protecting windows 52 and 54 from damage.

While the preferred embodiment of the invention has been described in detail, it should be apparent that many modifications and variations thereto are possible, all of which fall within the true spirit and scope of the invention.

We claim:

1. Optic fiber coupler apparatus comprising;
   a housing with a connecting end and an opposite end and an axial bore through said housing;
   connecting means wherein an optic fiber with mating connecting means is removably connected to said housing at said connecting end such that said axial bore and said optic fiber coaxially align;
   a gradient refractive index (GRIN) lens permanently located in said axial bore at said opposite end, and adhered to said housing to collimate optic fiber input/output medium.

2. The coupler apparatus of claim 1 wherein said GRIN lens is adhered in said axial bore such that the correct focal length between said GRIN lens and the end of said optic fiber is achieved when said optic fiber is connected to said housing.

3. The coupler apparatus of claim 2 wherein said connecting means comprising a threaded section adapted to accept a threaded optic fiber connector.

4. The coupler apparatus of claim 3 further comprising a protective window in said axial bore adjacent to said GRIN lens, thereby protecting said GRIN lens.

5. The coupler apparatus of claim 4 wherein said protective window comprising an optical filter material.

6. The coupling apparatus of claim 4 wherein said protective window is recessed from the end face of said apparatus.

7. A method of coupling optic fibers comprising:
   selecting a first optic fiber releasably connected to a first optic fiber coupler said first optic fiber coupler comprising:
      a housing with a connecting end and an opposite end, and an axial bore through said housing;
      connecting means wherein said first optic fiber with mating connecting means may be removably connected to said housing at said connecting end such that such axial bore and said optic fiber coaxially align;
      a gradient refractive index (GRIN) lens permanently located in said axial bore at said opposite end, and adhered to said housing to culminate optic fiber input/output medium;
   selecting a second optic fiber releasably connected to a second optic fiber coupler, and said second optic fiber coupler comprising a housing with a connecting end and an opposite end and an axial bore through said housing;

connecting means wherein said second optic fiber with mating connecting means may be removably connected to said housing at said connecting end such that said axial bore and said optic fiber coaxially align;

a gradient refractive index (GRIN) lens permanently located in said axial bore at said opposite end, and adhered to said housing to culminate optic fiber input/output medium;

and applying separate positioning means to each said first and second optic fibers and accompanying optic fiber couplers such that two said optic fiber couplers are disposed in a juxtaposed position such that said axial bores and GRIN lenses coaxially align.

* * * * *